Dec. 31, 1940.  L. M. EDGAR ET AL  2,226,712
SHOCK ABSORBING STEERING FORK FOR CYCLES
Filed Feb. 6, 1939  2 Sheets-Sheet 1

INVENTOR.
LUTHER M EDGAR &
LEON A SMITH
BY
THEIR ATTORNEY.

Dec. 31, 1940.   L. M. EDGAR ET AL   2,226,712
SHOCK ABSORBING STEERING FORK FOR CYCLES
Filed Feb. 6, 1939   2 Sheets-Sheet 2

INVENTOR.
LUTHER M. EDGAR &
LEON A. SMITH
BY John H. Leonard,
THEIR ATTORNEY.

Patented Dec. 31, 1940

2,226,712

UNITED STATES PATENT OFFICE 2,226,712

SHOCK ABSORBING STEERING FORK FOR CYCLES

Luther M. Edgar and Leon A. Smith, Shelby, Ohio, assignors to The Shelby Cycle Company, Shelby, Ohio, a corporation of Ohio Application February 6, 1939, Serial No. 254,854

3 Claims. (Cl. 280—276)

This invention relates to an improvement in steering wheel suspensions for cycles, and particularly to a steering fork and steering post combination with shock absorbing and bearing wear-reducing characteristics.

An object is to provide an improved manner of mounting a steering wheel on a bicycle, velocipede or motorcycle so that shocks imparted through the steering wheel can be absorbed in a simple and effective manner without interfering in any way with the steering capabilities of the apparatus or the stability of the mechanism as a whole.

Another object is to provide a spring shock absorbing construction for a steering mechanism of a cycle which is combined with the steering mechanism in a manner affording a much greater mechanical advantage to the spring, thereby increasing the shock absorbing efficiency.

A further object is to provide an improved combined steering fork and post for cycles.

A still further object is to provide a triangular truss reinforcement for a steering fork unit or assembly combined in a new and effective manner with a yieldable connection between the wheel-supporting and the swivel guide portions of the fork units.

Another object is to provide an improved shock absorbing unit in a cycle steering mechanism while maintaining the benefits of truss reinforcements for the steering wheel fork and post.

Other objects and features of the invention will become apparent from the following description relating to the accompanying drawings showing a preferred construction. The essential characteristics are summarized in the claims.

Figure 1:
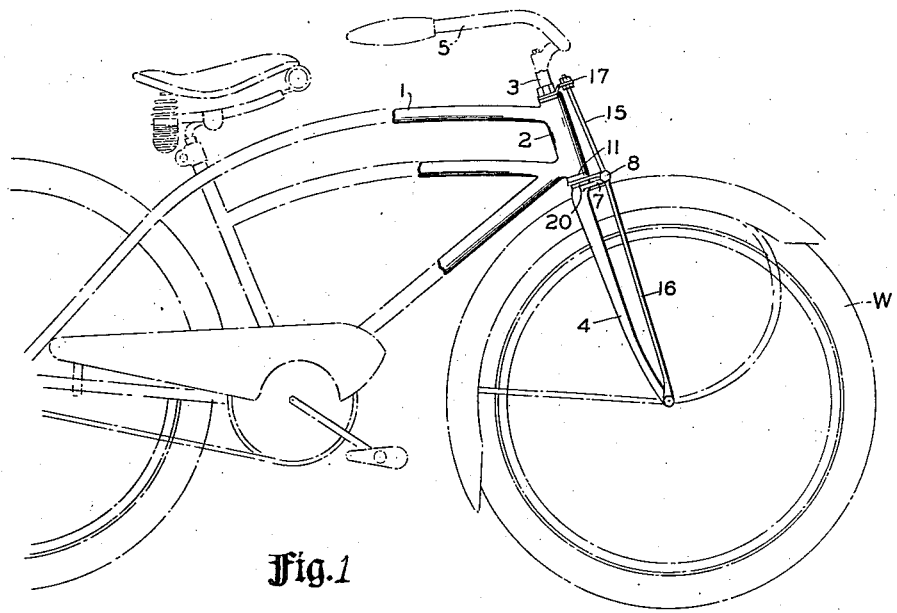
Figure 3:
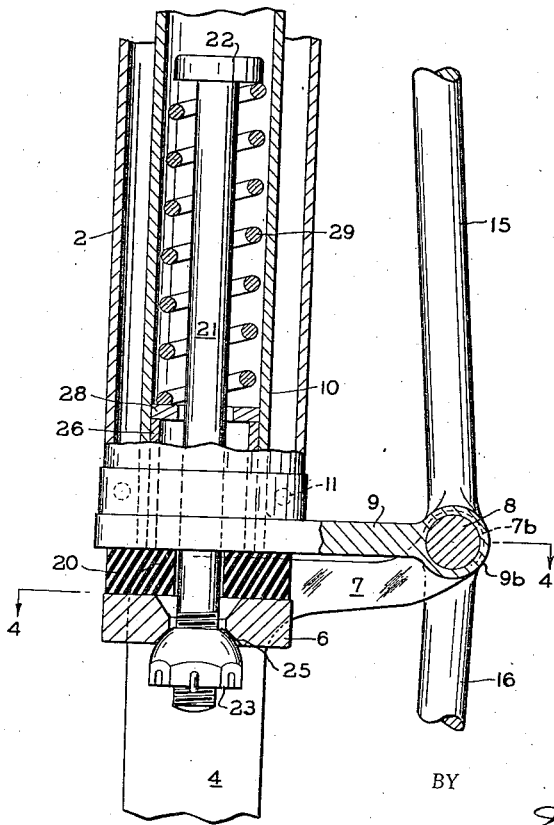
Figure 2:
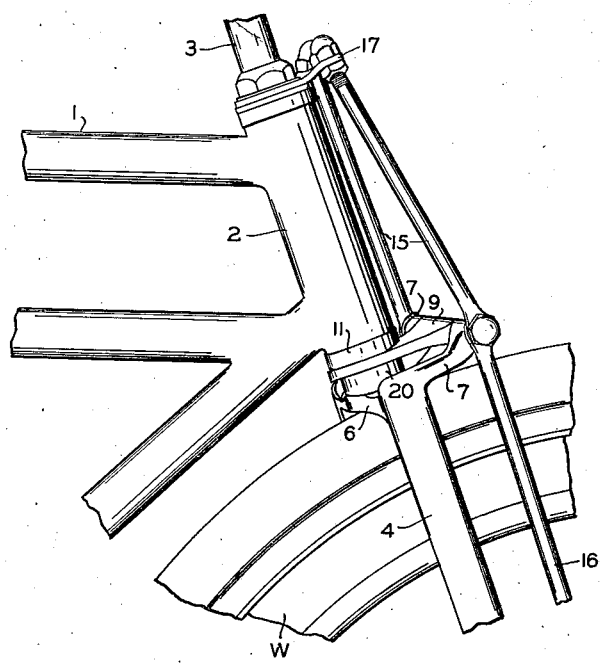
Figure 4:
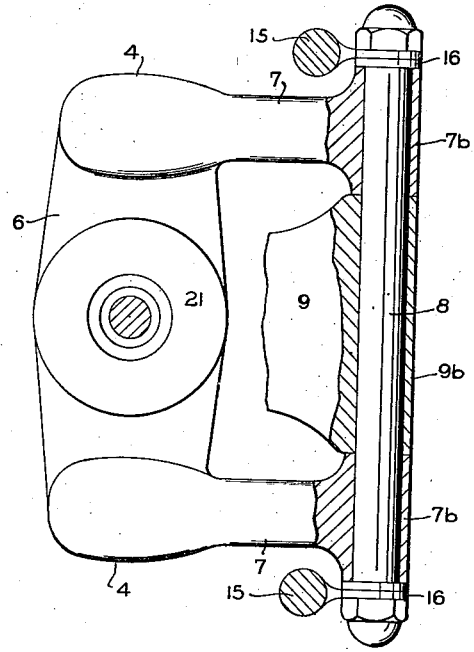

Referring to the drawings, Fig. 1 is a side elevation of a bicycle, all parts except those associated with the head portions of the frame and the steering fork assembly being shown diagrammatically; Fig. 2 is a fragmentary perspective view of the steering mechanism and forward frame portion of the cycle; Fig. 3 is a vertical sectional view taken centrally of the head portion of the frame, and showing the steering mechanism in section in the plane of the steering wheel; and Fig. 4 is a sectional plan view of a portion of the steering mechanism, the view being taken substantially along the line 4—4 in Fig. 3.

In modern cycles, the axis of the post or stem portion of the steering fork extends downwardly and forwardly at a substantial angle to the vertical or to a line which is normal to the track, wherefore the hub of the steering wheel is located a considerable distance forwardly of the head portion of the cycle frame. Thus, in conventional constructions, the portion of the weight of the rider which is carried by the front wheel tends to rotate the steering fork upwardly and forwardly about the lower bearing for the stem or post. Truss rods were originally provided forwardly of the steering fork and post principally to stiffen the fork unit so that there would be less tendency to distort the stem adjacent the fork head and less tendency to cause excessive wear on such lower bearing by forces imparted in the plane of the front wheel whether upwardly or rearwardly as to the wheel. When the truss rods and their supporting connections provide interconnected triangular truss sections above and below the head region of the fork, then they are very effective in preventing such distortion of the fork unit and excessive wear on the stem bearings. However, the recent trend in cycle construction is to provide rods in place of the original truss rods and which function principally to decorate the cycle rather than to strengthen it. The present arrangement adapts true truss rod construction to a new purpose in connection with absorbing shock to the rider and to the steering mechanism generally.

Spring suspensions for the front or steering wheels of cycles have been proposed in which the yieldability is between the steering fork and the wheel hub; in which the fork (or part of it) slides in the headpiece of the frame; and in which provision for relative movement incident to spring suspension is provided between the fork and its post by pivotally connecting the last mentioned parts together. The present construction is of the latter type. In the previously proposed arrangements of this latter type, the fork and its post or stem usually have been pivoted together on a horizontal axis either substantially on the axis of the post or rearwardly therefrom. Pivoting of the fork on the post axis requires extensions of the fork or post assembly, or both, either forwardly or rearwardly of the main frame head axis in order to carry the necessary spring connections. Further, this arrangement requires limiting means for the pivotal motion between the parts, etc., or requires exposed springs or spring housings, and otherwise complicates the construction or makes it unsightly.

Arrangements in which the fork and post are horizontally pivoted together rearwardly from the post axis enable shock absorbing or motion limiting springs to be contained in the head parts, as within a central bore or cavity of the post, but a spring so mounted and rendered effective to resist forward rotational movement of the fork about the horizontal pivot operates at a decided mechanical disadvantage in relation to the principal forces tending so to rotate the fork.

The present arrangement enables a main shock absorbing spring to be mounted within a hollow steering post and in such relation to the remainder of the structure that the spring will operate at much better mechanical advantage in resisting upward forces applied to the wheel.

The present arrangement also enables a truss rod structure comprising true triangular truss sections to cooperate in supporting elements of the pivotal connection between the fork and steering post, and, at the same time, to assist in connecting the fork and post for steering.

Referring in detail to the drawings, the frame of the cycle, generally indicated at 1, has the usual backbone and upper frame bars connected to a headpiece 2 in which the stem or post 3 is swiveled for supporting the fork 4. The headpiece 2 is inclined forwardly and downwardly so that the axis of the hub of the steering wheel W is positioned considerably forwardly from the headpiece of the frame. The fork can be connected to the wheel hub in any convenient manner and the upper end of the stem or steering post of the fork is connected appropriately to a handle bar assembly of conventional construction, shown at 5.

As indicated above, the fork and steering post are separate parts, a head or crotch portion of the fork 6 being extended forwardly in the form of bracket arms 7 which are pivoted by a horizontal pin 8 to a forwardly extending bracket portion 9 of a tubular member 10 which may comprise the lower end portion of the post. Boss portions 7b and 9b of the bracket portions 7 and 9 are in mutual abutment and receive and support the pin 8.

The tubular member 10 has lower and upper bearings in the headpiece 2 of the frame, the lower bearing only being indicated at 11. Suitably secured to the bracket members 7 and 9 at two end portions of the pivot pin 8 are upper and lower truss rods 15 and 16 which are in pairs. The upper pair of truss rods 15 are connected to a plate 17 which is suitably keyed or locked to the tubular member 10 so as to turn therewith in steering, as well understood at the present date. The upper rods 15 diverge downwardly to their points of connection with the bracket assembly 7—9 so that rotational impulses imparted to the steering post through the handle bar assembly will be transmitted effectively to the wheel-supporting or arm portions of the fork. The truss rods 16 mutually overlap the lower ends of the rods 15 at the pivot pin 8 and are conventionally connected to the front wheel axle as usual in truss rod constructions. The overlapped ends of the rods 15 and 16 may be held onto the pin 8 by nuts 19 as indicated in Figs. 2 and 4.

Located between the head portion 6 of the fork and the lower end of the tubular portion of the post 10 is a block 20 of resilient material, such as rubber, and the adjacent faces of the member 10 and the head portion 6 of the fork are held normally in contact with the block 20 by a spring assembly comprising a rod 21 having a head 22 at its upper end, and which extends downwardly loosely through a central opening in the cushion block 20, and an opening in the fork head 6 aligned therewith, to a nut 23 threaded to the lower end of the rod and having a spherical upper surface bearing in a complementary socket 25 on the under side of the head portion 6 of the fork.

Inside the member 10 is a reinforcing sleeve 26 which may be welded in place so as to carry a spring perch 28 on its upper end. A compression coil spring 29 seats at its lower end on the perch 28 and bears upwardly against the head 22 of the rod 21. Adjustment of the spring strength can be secured by rotation of the nut 23. As shown, the nut 23 is castellated on its lower side for a locking pin adapted to pass through a suitable opening in the rod 21.

The spherical nut and loose connection between the rod 21 and the hollow post enables free swinging movement of the fork 4 downwardly and forwardly against the restraining action of the spring 29 when the cycle is under load. In the design of cycle shown and with a spring of the relative proportions indicated by Fig. 3, a rider weighing 150 pounds causes the hinged bracket portions of the fork and head to be moved apart a very few degrees against the action of the spring 29. The spring urges the fork head back against the cushion and normally holds it against the cushion when the cycle is not loaded. The spring and cushion cooperate in limiting the movement of the fork about the hinge pin 8 and the shock absorbing action does not interfere in any way with effective steering.

It will be seen that the upper truss rods 15, in addition to assisting in transmitting steering torque to the fork 4, brace the bracket 9, and that the lower truss rods 16 brace the lower bracket 7. The truss rods cooperate with the brackets and the aligned portions of the fork and post to form true triangular truss sections. When the fork and post are held against each other by the spring 29 (compressing the cushion washer 20), the truss rods then act as tension members to prevent a rearward force on the wheel (as when encountering an upstanding obstruction) from damaging the brackets 7 and 9 or bending the fork arms.

Since the spring 29 acts upwardly on one end of an effective lever which swings about the hinge pin 8 and the upward force on the wheel acts upwardly on the opposite end of said effective lever, the spring operates at a considerable advantage over any possible similar arrangement in which the hinge pivot which connects the fork and post together is disposed rearwardly from the post axis. In the latter arrangement, the upward force on the wheel acts upon a much longer effective lever arm and the spring on a relatively shorter one. Consequently, the spring in the present instance can be housed in the head of the frame and can be relatively light, while enabled to support the weight of a heavy rider without substantial flexure.

The truss rods brace the pivot supporting brackets 7 and 9, assist in transmitting steering torque to the fork 4, and act as tension members in resisting such forces as are applied in a manner tending to rotate the fork rearwardly about the frame head, as already mentioned. It is not important in the present construction for the truss rods to assist materially in preventing forward movement of the work with reference to its post portion, because the fork is not rigidly connected to the post.

We claim:

1. In a cycle having a forwardly mounted steering fork and a guiding post therefor separable therefrom endwise of the post, a truss system comprising triangular truss sections connected respectively to the post and fork and which normally abut and are separable from each other at or near the upper end of the fork and pivotally attached together about a horizontal axis horizontally spaced from the axis of the post forwardly thereof in the normal direction of movement of the cycle, and spring means disposed inside the post and yieldably opposing the relative movement of the sections away from each other about the horizontal pivot axis.

2. In a steering fork and post combination wherein the fork and post are separable endwise of the post, bracket portions on the fork and post adjacent the region of separability thereof and extending forwardly therefrom, a hinge pin connecting the forward ends of the bracket portions together on a horizontal axis, yielding means opposing relative pivotal movement of the fork and post in one direction, and pairs of truss rod elements including a pair of elements connected to an upper rigid part of the post and diverging downwardly and connected to end portions of the hinge pin, and another pair connecting said end portions of the pin, respectively, with lower end portions of the fork arms.

3. In a cycle, a hollow steering post having a downwardly open end, a steering fork, means including a bracket on the post pivotally connected with a bracket portion of the fork remotely of the axis of the post, a reinforcing sleeve for the post rigidly secured in said open end and extending in bridging relation to the bracket and post, a rod connected to the fork and extending through the sleeve into the post, and a spring surrounding the rod, bearing upwardly on the same and downwardly on said sleeve, to draw the fork and post toward each other about the pivotal connection.

LUTHER M. EDGAR.
LEON A. SMITH.